United States Patent [19]

Sims

[11] Patent Number: 5,339,491
[45] Date of Patent: Aug. 23, 1994

[54] SEALED RETAINER GROMMET

[75] Inventor: Kenneth A. Sims, Romulus, Mich.

[73] Assignee: United Technologies Automotive, Inc., Dearborn, Mich.

[21] Appl. No.: 972,959

[22] Filed: Nov. 6, 1992

[51] Int. Cl.5 .................... B65D 55/00; F16B 21/00
[52] U.S. Cl. .......................................... 16/2; 411/512; 411/339; 411/907
[58] Field of Search .............. 411/512, 338, 339, 907; 16/2

[56] References Cited

U.S. PATENT DOCUMENTS

| | | |
|---|---|---|
| 2,882,780 | 4/1959 | Edwards . |
| 2,951,674 | 9/1960 | Rice . |
| 3,118,644 | 1/1964 | Wernig . |
| 3,126,185 | 3/1964 | Christman . |
| 3,200,694 | 8/1965 | Rapata ................... 16/2 |
| 3,234,612 | 2/1966 | Raymond . |
| 3,269,680 | 8/1966 | Bryant . |
| 3,302,913 | 2/1967 | Collyer et al. . |
| 3,417,438 | 12/1968 | Schuplin . |
| 3,701,302 | 10/1972 | Pestka et al. . |
| 4,140,235 | 2/1979 | Rausing et al. . |
| 4,176,428 | 12/1979 | Kimura . |
| 4,186,645 | 2/1980 | Zaydel ................... 411/55 |
| 4,202,463 | 5/1980 | Mogler . |
| 4,716,633 | 1/1988 | Rizo . |
| 4,726,722 | 2/1988 | Wollar . |
| 4,861,208 | 8/1989 | Boundy . |

Primary Examiner—Carmine Cuda
Attorney, Agent, or Firm—Harness, Dickey & Pierce

[57] ABSTRACT

A sealed retainer grommet apparatus for securing a standard retainer member to a vehicle body panel. The apparatus generally includes a frusto-conical portion, an intermediate portion and a top portion. Both the top portion and a first end portion of the frusto-conical portion are generally circular in shape and have outer diameters which are larger than an outer diameter of the intermediate portion, which is also preferably circular in shape, to thereby form a channel. The apparatus 10 is secured to the body panel by inserting the frusto-conical portion through an opening of the body panel where the channel receives a section of the body panel member lockably therein. A bore extends through the top portion, the intermediate portion and at least a portion of the frusto-conical portion to define an interior sidewall portion. The interior sidewall portion includes a plurality of interior locking shoulder portions which lockably engage with locking shoulders of a conventional standard retainer of the "Christmas tree" type when the standard retainer is inserted into the bore of the apparatus 10. The apparatus enables the use of standard retainer members in lieu of other fastening means such as drillpoint screws, and further helps seal the opening to prevent corrosive elements such as water and salt from entering through the opening in the body panel member.

3 Claims, 1 Drawing Sheet

SEALED RETAINER GROMMET

BACKGROUND OF THE INVENTION

1. Technical Field

This invention relates generally to retainers, and more particularly to a sealed retainer grommet adapted to be inserted within an opening in a body panel member, such as a body panel member for a vehicle.

2. Discussion

Conventional drillpoint screws are used in a wide variety of applications to secure articles or various other components to panel members, such as body panel members of a vehicle. The drillpoint screws are typically driven into the body panel member by a power drill and extend through some form of collar or other like retainer to hold the collar or like retainer securely to the body panel member. The collar, in turn, is then used to hold another article, such as a portion of a wiring harness, securely to the body panel member.

Drillpoint screws, however, have a number of disadvantages when used in applications where the body panel member may be exposed to elements such as water, salt, or other like corrosive elements. For example, while used extensively in the automotive field to secure various collars or other like retainers to interior body panel members of a vehicle, drillpoint screws have the disadvantage of providing a path through which corrosive elements such as water or salt may enter interior compartments of the vehicle formed by the body panel members.

Another disadvantage of conventional drillpoint screws is that wire assemblies can be damaged due to improper installation of the screws. Since the drillpoint screws have sharp ends necessary to pierce metal, the screws themselves can cause damage if they accidently come in contact with wire assemblies or other components being secured to the vehicle body panel.

Yet another disadvantage of drillpoint screws is that drills or other like power driven implements are often needed to quickly drive the drillpoint screws into secure engagement with the body panel member. Even with power driven implements, when a significant number of drillpoint screws need to be installed, such as on a vehicle, the cost of labor in installing the drillpoint screws can be significant.

Finally, since drillpoint screws pierce the sheet metal with which they engage, the sheet metal becomes more susceptible to corrosion damage after the drillpoint screws are installed.

As an alternative to the use of conventional drillpoint screws, standard "Christmas tree" type retainer members are often employed by directly inserting them through predrilled holes in a body panel member. The standard retainer members typically include a plurality of locking shoulder portions which extend through a collar or other like component and through an opening of a body panel member. The locking shoulder portions engage the periphery of the opening of the body panel member to prevent the standard retainer member from being easily withdrawn from the opening, to thereby secure the collar or other like component to the body panel member. The standard retainer member also provides the advantage of quicker installation as compared to conventional drillpoint screws since it typically can be "pressed" into the opening, rather than drilled, thereby reducing the time it takes to insert the standard retainer member.

While being quicker to install than conventional drillpoint screws, the standard retainer member nevertheless typically does not sufficiently seal the opening in the body panel member to prevent corrosive fluids or other like components from passing through the opening. As described above, in automotive applications, it is highly desirable to "seal" such openings to prevent such corrosive components such as salt and water from entering interior compartments of the vehicle.

Accordingly, it is a principal object of the present invention to provide a sealed retainer grommet apparatus which is particularly well adapted to be inserted through an opening in a body panel member, such as a body panel member of a vehicle, which not only provides a good "seal" of the opening but also enables a conventional standard retainer member to be used to secure a collar or other like instrument to the body panel member.

It is still another object of the present invention to provide a sealed retainer grommet apparatus which is integrally formed as a single piece component and adapted to be quickly and easily inserted into an opening in a body panel member without the need for special or expensive tools.

It is still another object of the present invention to provide a sealed retainer grommet apparatus which can be manufactured relatively quickly and inexpensively from widely available materials.

SUMMARY OF THE INVENTION

The above and other objects are provided by a sealed retainer grommet apparatus in accordance with a preferred embodiment of the present invention.

The apparatus generally comprises a frusto-conical portion having a first end portion and a second end portion, where the second end portion includes a closed bottom portion, an intermediate portion integrally formed with the frusto-conical portion and extending therefrom, and a top portion having a top surface and a lower edge surface. A bore extends generally concentrically through the top portion, the intermediate portion and at least partially into the frusto-conical portion. The bore forms an interior sidewall portion adapted to receive a mating locking shoulder portion of a standard "Christmas tree" type retainer member therein. The interior sidewall portion further includes an interior locking portion protruding outwardly therefrom to lockably engage with the mating locking shoulder portion of the standard retainer member.

In the preferred embodiment, the first end portion of the frusto-conical portion, the intermediate portion and the top portion are each generally circular in shape. The intermediate portion has an outer diameter which is less than an outer diameter of the first end portion of the frusto-conical portion and also less than an outer diameter of the top portion. Accordingly, a channel is formed between the top portion and the first end portion for receiving a section of the body panel member therein. The channel helps secure the apparatus securely to the body panel member.

A principal advantage of the apparatus is that it provides a good "seal" of the opening to which it is attached, thereby virtually inhibiting the passage of corrosive elements such as water and salt through the opening in the body panel member. In particular, the closed bottom portion of the frusto-conical side portion prohibits any corrosive elements entering the bore from passing through the apparatus.

In the preferred embodiment of the invention the interior sidewall portion comprises a plurality of interior locking shoulder portions which protrude outwardly therefrom. The interior locking shoulder portions securely, matingly engage with the mating locking shoulder portion of the standard retainer member to thereby prevent the standard retainer member from being easily "pulled out" from the bore.

The apparatus of the present invention provides significant advantages in that it enables standard Christmas tree type retainer members to be used to secure wire assemblies or other components to a body panel member while providing a good seal of the opening through which the standard retainer member extends. By enabling the use of standard retainer members, the generally higher labor costs associated with installing drillpoint screws, and the other potential problems drillpoint screws present, are avoided.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
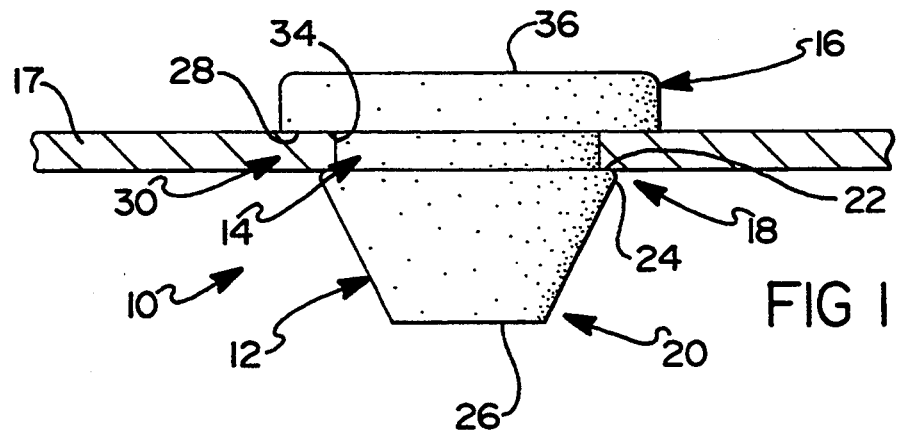
FIG. 1 is an elevational side view of a sealed retainer grommet apparatus in accordance with a preferred embodiment of the present invention showing the apparatus secured within an opening of a panel member, shown in cross section, such as a panel of a vehicle.

Referring to FIG. 1, there is shown a sealed retainer grommet apparatus 10 in accordance with a preferred embodiment of the present invention. The apparatus 10 generally comprises a preferably generally circular frusto-conical portion 12, a preferably generally circular intermediate portion 14, and a preferably generally circular top portion 16. A section of a panel member 17 is also shown, which may represent a body panel of a vehicle, or virtually any other form of panel, to which the apparatus 10 may be secured.

The frusto-conical portion 12 includes a first end portion 18 and a second end portion 20. The first end portion further includes an upper surface 22 and a preferrably rounded shoulder portion 24. The second end portion 20 further includes a closed bottom portion 26, while the top portion 16 includes a lower surface 28 and a top surface 36. The first end portion 18 is also preferably circular in shape, although it will be appreciated that the shape of frusto-conical portion 12 may instead have four planar sides which diverge outwardly toward the first end portion 18 if a suitable square opening is provided through which it may extend. The intermediate portion 14 has an outer diameter which is at least slightly less than an outer diameter of the first end portion 18, and less than a diameter of an opening 34 in the body panel member 34 also, it will be appreciated that the veritcal length of the intermediate portion 14, and thus the channel 30, is at least equal to, and preferably slightly greater than, the cross sectional thickness of the body panel member 17. The top portion 16 is also preferably circular in shape and has an outer diameter which is preferably greater than the outer diameter of the intermediate portion 14.

A channel 30 is formed between the lower surface 28 of the top portion 16 and the upper surface 22 of the first end portion 18. The channel readily receives a portion of the body panel member 17 when the apparatus 10 is inserted through the opening 34 in the body panel member 17. Insertion of the apparatus 10 is accomplished by aligning the second end portion 20 generally concentrically with the opening 34 and pressing on the top surface 36 of the top portion 16. The frusto-conical portion 12 is then driven through the opening 34 and compresses slightly as the first end portion 18 passes through the opening 34. As soon as the first end portion clears the opening 34, the first end portion 18 decompresses to clampingly secure the body panel member 32 within the channel 30.

The apparatus 10 may be manufactured from a wide variety of materials such as rubber, or any other slightly compressible material. The frusto-conical portion 12, intermediate portion 14 and top portion 16 are also preferably integrally formed by any conventional manner such as injection molding.

Figure 2:
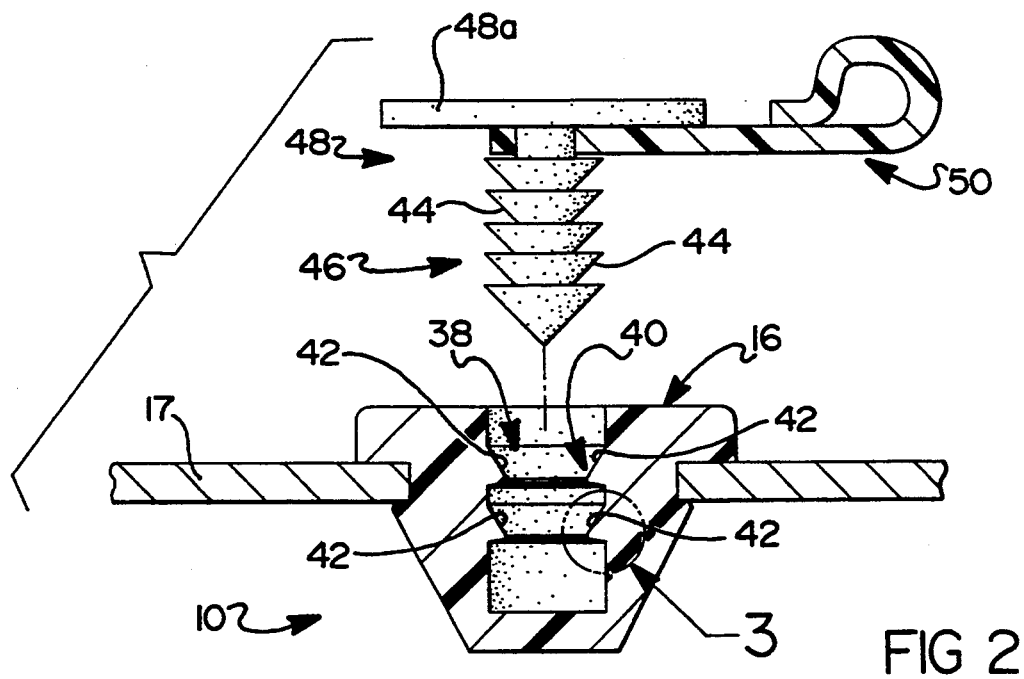
FIG. 2 is a cross sectional illustration of the apparatus of FIG. 1 and also an elevational view of a standard retainer member and a collar through which the standard retainer member extends, illustrating how the standard retainer member may be used with the apparatus of the present invention.

Referring now to FIG. 2, the apparatus 10 includes a generally circular bore 38 extending generally concentrically through the top portion 16, intermediate portion 14 and frusto-conical portion 12. The bore 38 defines an interior sidewall portion 40 having a plurality of interior locking shoulder portions 42. The locking shoulder portions 42 extend generally outwardly of the interior sidewall portion 40 and are spaced apart from one another to engage a corresponding plurality of locking shoulders 44 of a mating locking shoulder portion 46 of a standard, "Christmas tree" type retainer member 48.

When the standard retainer member 48 is inserted through a conventional collar portion 50, which may be used to hold a portion of a wiring assembly of a vehicle, the locking shoulders 44 engage the interior locking shoulder portions 42 to prevent the standard retainer member 48 from being easily withdrawn from the bore 38. Accordingly, the collar 50 or other component being secured to the vehicle body panel member 17 is prevented from being easily removed from the body panel member 17 by the standard retainer member 48. As an alternative method of attachment, a portion of the wiring harness may be secured directly via suitable tape, such as electrical tape, to a head portion 48a of the standard retainer member 48. In many instances this method of attachment may actually be preferred, such as when constructing vehicle wiring harnesses for quick installation on an assembly line.

The apparatus 10 of the present invention provides numerous advantages over conventional drillpoint screws in securing wiring assemblies or other components to vehicle body panels. It is a principal advantage of the apparatus 10 that the use of a standard, "Christmas tree" type retainer member, such as retainer member 48, may be used to secure components to vehicle body panels quickly, easily and with less labor than required by conventional drillpoint screws. It is still another significant advantage of the apparatus 10 that the apparatus 10 provides a good "seal" of the opening 34 of the body panel member 17 to help prevent water, salt or other corrosive agents from entering through the opening 34 and possibly corroding the interior of the body panel member 17 or the interiors of other body panel members. The apparatus 10 further helps to ensure that other components such as wiring assemblies are not damaged by the retainer member, as could be the case with conventional drillpoint screws.

Figure 3:
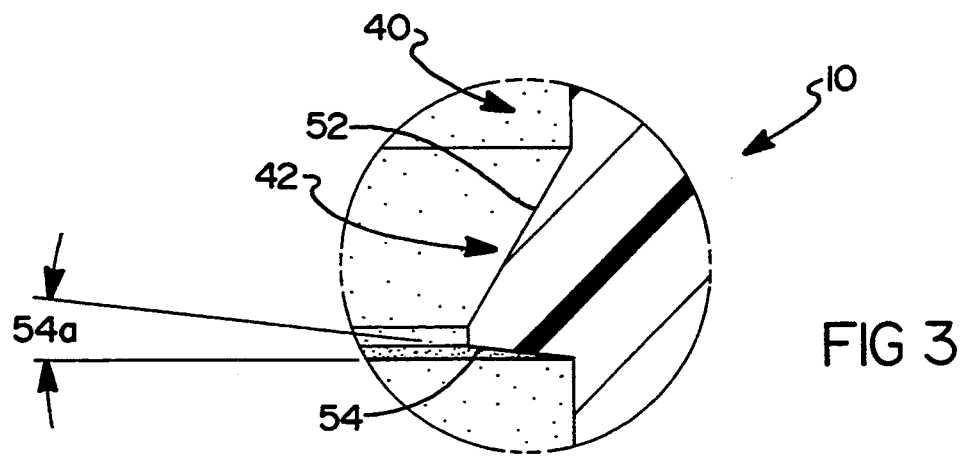
FIG. 3 is an enlarged view of one of the interior locking shoulder portions of the apparatus showing more clearly the preferred angle at which the locking shoulder portions extend from an interior sidewall portion of the apparatus.

Referring briefly now to FIG. 3, an enlarged cross section of one of the interior locking shoulder portions 42 is shown. The interior locking shoulder portion 42 includes a first wall portion 52 and a second wall portion 54. The first wall portion 52 extends at an acute angle outwardly of the interior sidewall portion 40. The second wall portion likewise extends at an acute angle from a plane extending transversely from the interior sidewall portion 40. The angle of the first wall portion 40 may vary in accordance with the angle of the locking shoulders 44 of the mating locking shoulder portion 46. The second wall portion may also vary considerably, but is preferably about 5 degrees, as indicated by angle 54a.

It should therefore be appreciated that the apparatus 10 provides significant advantages over conventional drillpoint screws to enable various components such as wiring assemblies to be secured to vehicle body panels, while simultaneously helping to prevent corrosive elements such as water and salt from entering through openings in the body panels. The apparatus may be constructed relatively easily and inexpensively and can significantly ease the assembly process of securing wiring assemblies and other like components to vehicle body panels, as compared to conventional drillpoint screws.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A sealed retainer grommet apparatus for use with a standard Christmas tree type member, where said retainer member is adapted to be linearly inserted into said grommet apparatus without threadably engaging said apparatus, said apparatus comprising:

a frusto-conical portion having a first end portion having an upper surface and a second end portion, said second end portion including a closed bottom portion;

an intermediate portion extending from said first end portion;

a top portion extending from said intermediate portion, said top portion further including a lower edge surface extending generally parallel to said upper surface of said first end portion of said frusto-conical portion;

a bore extending generally coaxially through said top portion, said intermediate portion, and at least partially through said frusto-conical portion, said bore forming an opening into which said standard Christmas tree type retainer member may be inserted, said bore further defining an interior sidewall portion; and a plurality of independent interior locking shoulder portions protruding outwardly of said interior sidewall portion and spaced longitudinally apart along said interior sidewall portion for lockably engaging a plurality of mating locking shoulders of said retainer member to thereby secure said retainer member lockably within said bore while generally inhibiting the passage of fluids or corrosive elements through an opening in a panel member in which said apparatus is mounted;

said interior locking shoulder portions each including a first wall portion extending from said interior sidewall portion at an angle relative to said interior sidewall portion, and a second wall portion extending from said interior sidewall portion at an acute angle relative to a plane extending transversely of said interior sidewall portion, said acute angle comprising an angle of about five degrees relative to a plane extending transeversely of said interior sidewall portion.

2. The apparatus of claim 1, wherein said top portion, said intermediate portion and said first end portion each comprise a generally circular portion, wherein said intermediate portion has an outer diameter which is less than an outer diameter of said top portion and an outer diameter of said first end of said frusto-conical portion, to thereby form a channel into which a section of said panel member protrudes when said apparatus is lockably engaged with said panel member.

3. The apparatus of claim 1, wherein said intermediate portion comprises a diameter which is slightly less than a diameter of said opening of said panel member.

* * * * *